(12) United States Patent
Lin

(10) Patent No.: US 7,899,065 B2
(45) Date of Patent: Mar. 1, 2011

(54) METHOD, APPARATUS AND SYSTEM FOR A MEDIA GATEWAY CONTROLLER TO DELIVER A RESOURCE PROVISION DECISION TO A MEDIA GATEWAY

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 12/342,546

(22) Filed: Dec. 23, 2008

(65) Prior Publication Data

US 2009/0103552 A1     Apr. 23, 2009

(30) Foreign Application Priority Data

Jun. 26, 2006   (CN) .......................... 2006 1 0093956
Jun. 25, 2007   (WO) ................ PCT/CN2007/070177

(51) Int. Cl.
*H04L 12/28*        (2006.01)
(52) U.S. Cl. ......................................... 370/401; 370/360
(58) Field of Classification Search .................... None
See application file for complete search history.

(56) References Cited

U.S. PATENT DOCUMENTS

| 6,832,254 | B1* | 12/2004 | Scoggins et al. ............. 709/227 |
| 6,876,646 | B1* | 4/2005 | Dore et al. .................... 370/352 |
| 6,944,166 | B1* | 9/2005 | Perinpanathan et al. ..... 370/401 |
| 7,085,264 | B2* | 8/2006 | Erhart et al. .................. 370/356 |
| 7,092,493 | B2* | 8/2006 | Hou et al. ....................... 379/35 |
| 7,693,141 | B2* | 4/2010 | Lin .................................. 370/360 |
| 2002/0184510 | A1 | 12/2002 | Shieh | |
| 2004/0010582 | A1 | 1/2004 | Oliver | |
| 2007/0177618 | A1* | 8/2007 | Matsushima ................. 370/401 |
| 2009/0103552 | A1* | 4/2009 | Lin .............................. 370/401 |
| 2009/0122803 | A1* | 5/2009 | Lin .............................. 370/401 |

OTHER PUBLICATIONS

ITU-T NGN FG Proceedings Part II, NGN-GSI; Dec. 31, 2005; pp. 1-767.
Office Action issued in corresponding Chinese Patent Application No. 2006100939566; issued Nov. 6, 2008.
Supplementary European Search Report issued in corresponding European Patent Application No. 07 72 1793; issued May 11, 2009.
Kamatani, Osamu et al. "H.28 Alternative for Q.rcp.3 Annex B from Q.5/11 Rapporteur Group Meeting" ITU-Telecommunication Standardization Sector, No. Kobe-Q5/11-039R2, Apr. 22, 2006.
Office Action issued in corresponding European Patent Application No. 07 721 793.3; issued Oct. 2, 2009.

* cited by examiner

*Primary Examiner* — Robert W Wilson
(74) *Attorney, Agent, or Firm* — Brinks Hofer Gilson & Lione

(57) ABSTRACT

A method for a media gateway controller (MGC) to deliver a resource provision decision to a media gateway (MG) includes: the MGC receives a decision request from the MG and makes a resource provision decision according to service requirement information and/or resource status information, and delivers the resource provision decision to the MG. The present invention also discloses an MGC, an MG and a system comprising the MGC and MG. In the invention, the MGC does not deliver the resource provision decision already made according to service requirement information and/or resource status information until reception of a decision request from the MG so that the MGC delivers a resource provision decision passively upon request of the MG. The Pull mode for delivery of the resource provision decision is thus supported.

4 Claims, 2 Drawing Sheets

METHOD, APPARATUS AND SYSTEM FOR A MEDIA GATEWAY CONTROLLER TO DELIVER A RESOURCE PROVISION DECISION TO A MEDIA GATEWAY

FIELD OF THE INVENTION

The present invention relates to media gateway technologies, and in particular to a method for a media gateway controller (MGC) to deliver a resource provision decision to a media gateway (MG) as well as an MGC, an MG and a system for implementing the method.

BACKGROUND OF THE INVENTION

The separation of the service layer and the bearer layer further requires effective control on bearer resources based on certain policies. According to the network architecture designed by major international standardization organizations, the bearer resources required by services are met through management of bearer resources by a bearer control layer. A bearer resource control network is shown in FIG. 1, where, a service control function (SCF) is located at the service layer, a network attachment control function (NACF), a resource and admission control function (RACF) are placed at the bearer control layer of the bearer layer, and a transport function (TF) is at the bearer resource layer of the bearer layer. The RACF further includes a policy decision functional entity (PD-FE) and a transport resource control functional entity (TRC-FE). The TF further includes a policy execution functional entity (PE-FE) and a transport resource execution functional entity (TRE-FE).

When a user service requires a bearer resource, the SCF sends a service requirement to the PD-FE in the RACF. The PD-FE obtains resource status from the TRC-FE, forms a resource provision decision according to a certain policy, and delivers the resource provision decision to the PE-FE for execution so that the required resource is provided for the service. For such a decision to be delivered from the PD-FE to the PE-FE, two modes are necessary: one is that the PD-FE sends the decision configuration on the provision of the related resource to the PE-FE actively, known as the Push mode which is relative to the PD-FE; the other is that the PD-FE sends a decision on the provision of the related resource in response to a request of the PE-FE, known as the Pull mode which is relative to the PE-FE.

H.248 is gradually becoming a mainstream protocol in bearer control, especially for the interface between PD-FE and PE-FE. When H.248 is applied to the interface between PD-FE and PE-FE, the PE-FE is equivalent to an MGC and the PE-FE is equivalent to an MG. However, the primary control model of H.248 now is that the MGC manager resources on the MG. This means the MGC delivers resource provision decisions to the MG actively according to the service requirement information of users and/or resource status. As a result, the method provided by H.248 for an MGC to deliver resource provision decisions to an MG only supports the Push mode. The Pull mode, however, is not supported. The service requirement information may be media stream information and/or user information.

In addition, in the foregoing method for an MGC to deliver resource provision decisions to an MG actively, if the MG does not receive a media stream establishing request from the user immediately after the MGC delivers a resource provision decision to the MG so as to execute the resource provision decision to establish a media stream, the MG needs to store the resource provision decision for the period before reception of the media stream establishing request. This will occupy the limited storage space in the MG, and the decision may not be suitable for the service requirement and resource status when the resource provision decision is finally executed.

SUMMARY OF THE INVENTION

Accordingly, embodiments of the invention provide a method for a media gateway controller (MGC) to deliver a resource provision decision to a media gateway (MG), which supports the Pull mode for delivery of a resource provision decision.

The method includes:

by the MGC, receiving a decision request from the MG, making a resource provision decision according to the decision request, and delivering the resource provision decision to the MG.

A media gateway controller (MGC) for implementing the method includes:

a decision request receiving module, adapted to receive a decision request for requesting a resource provision decision from a media gateway (MG);

a decision making module, adapted to make a resource provision decision according to service requirement information and/or resource status information; and a decision delivery module, adapted to deliver the resource provision decision made by the decision making module to the MG upon reception of a decision request by the decision request receiving module.

A media gateway (MG) for implementing the method includes:

a media stream establishing request receiving module, adapted to receive a media stream establishing request from a user;

a decision request generating module, adapted to generate a decision request for requesting a resource provision decision according to the media stream establishing request;

a decision request reporting module, adapted to report the decision request generated by the decision request generating module to a media gateway controller (MGC); and a decision receiving module, adapted to receive a resource provision decision from the MGC.

A system for a media gateway controller (MGC) to deliver a resource provision decision to a media gateway (MG) includes an MG and an MGC, where the MG is adapted to receive a media stream establishing request from a user, generate a decision request for requesting a resource provision decision, and report the decision request to the MGC; and the MGC is adapted to receive the decision request from the MG, make a resource provision decision according to service requirement information and/or resource status, and deliver the resource provision decision to the MG.

According to the above solution, in embodiments of the invention, the MGC does not deliver the resource provision decision already made according to service requirement information and/or resource status information until reception of a decision request from the MG so that the MGC delivers a resource provision decision passively upon request of the MG. The Pull mode for delivery of the resource provision decision is thus supported.

DETAILED DESCRIPTION OF THE EMBODIMENTS

Figure 1:
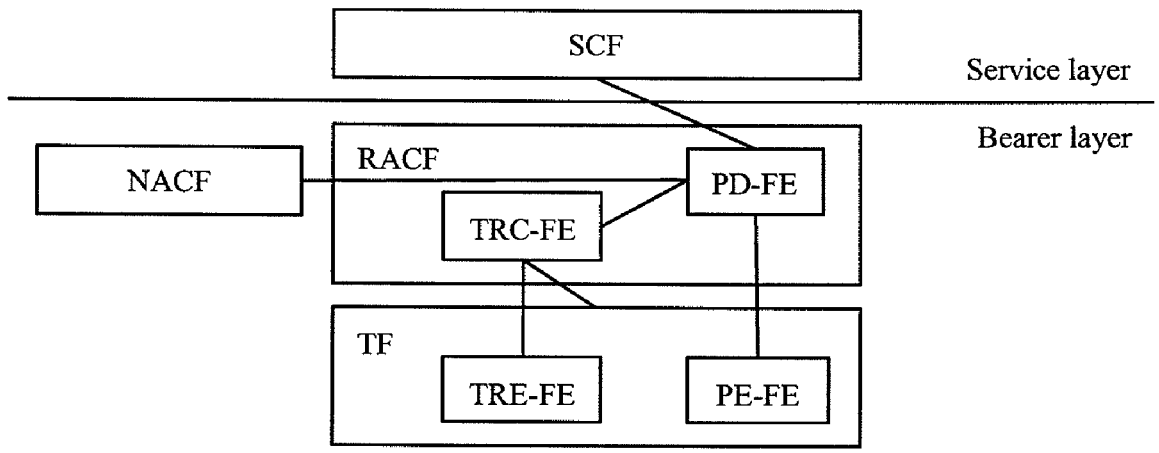
FIG. 1 shows a bearer resource control network in the prior art.

To better explain the purpose, technical solution and advantages of the invention, the following describes embodiments of the invention in detail with reference to the accompanying drawings.

In an embodiment of the invention, when a media gateway (MG) receives a media stream establishing request, the MG sends a decision request to a media gateway controller (MGC); upon reception of the decision request from the MG, the MGC makes a resource provision decision according to service requirement information and/or resource status information and delivers the decision to the MG.

The decision request sent by the MG to the MGC may not include service requirement information. In this case, the MGC obtains service information from the user in advance and makes a resource provision decision according to the service requirement information and/or resource status, and, upon reception of the decision request, the MGC delivers the resource provision decision relative to the decision request to the MG. Or, the decision request sent by the MG to the MGC may include service requirement information. In this case, the MGC may make a resource provision decision directly according to the service requirement information in the decision request and/or resource status and send the directly made resource provision decision to the MG, or the MGC may adjust a previous resource provision decision according to the service requirement information in the decision request and/or resource status and delivers the adjusted resource provision decision to the MG.

The decision request in the embodiments of the invention may be implemented in the event mechanism of H.248. Specifically, an event is extended on the basis of H.248, known as a decision request event in the embodiments of the invention. By means of the event, the MG detects decision requests and initiates decision requests to the MGC. The decision request event may be pre-set in the MG or sent to the MG by the MGC.

When the MGC obtains service requirement information from a user and makes a resource provision decision in advance, the MGC may set an authorization flag for the pre-made resource provision decision and send the authorization flag to the user; then the user sends the authorization flag to the MG via a media stream establishing request. In this case, the decision request sent by the MG to the MGC needs to carry the authorization flag and the MGC can obtain the pre-made resource provision decision according to the authorization flag.

The foregoing operations of the MG may be executed by a root terminal that presents the entire MG or specific terminals in the MG that have different attributes. Here, attribute means media stream information and/or user information related to a specific terminal.

The following describes the present invention through specific embodiments.

In a first embodiment of the invention, a decision request event is preset in the MG for detecting and reporting resource provision decision requests.

Figure 2:
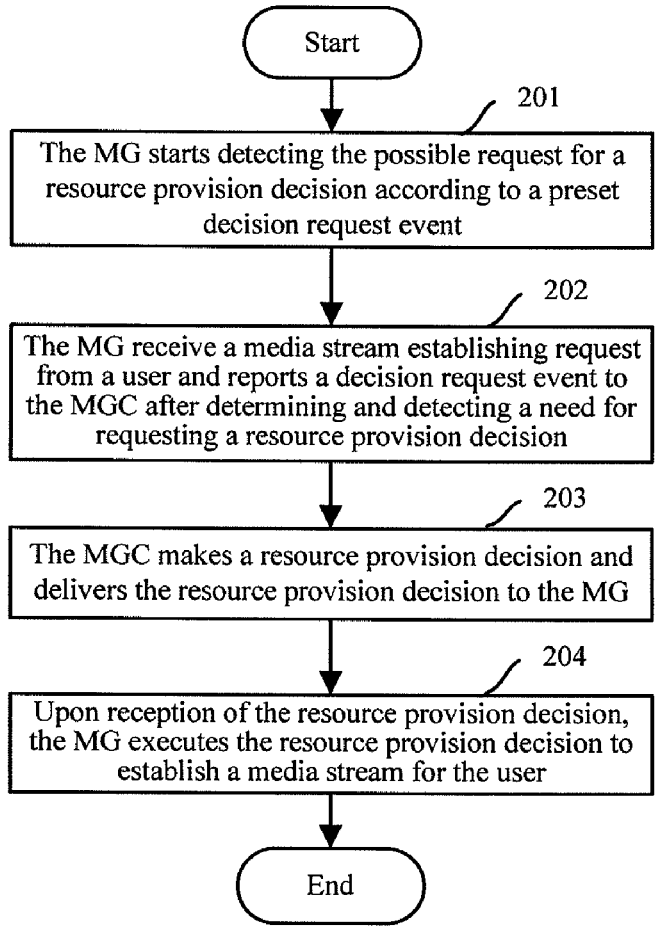
FIG. 2 shows a procedure where an MGC delivers a resource provision decision to an MG according to a first embodiment of the invention.

A procedure according to this embodiment is shown in FIG. 2, including the following steps:

Step 201: The MG starts detecting the possible request for a resource provision decision according to the preset decision request event.

In addition, according to H.248, resources in an MG are abstracted as terminals. The preset decision request event may be set in a root terminal that presents the entire MG or in different specific terminals that match with different attributes. Here, the attribute of a specific terminal means media stream information and/or user information related to a specific terminal.

In this embodiment, the following steps may be executed by the root terminal or a specific terminal on the MG.

Step 202: When the MG detects a media stream establishing request from a user, the MG determines that it is necessary to request a resource provision decision. After the decision request event preset in the MG detects the request, the MG reports service requirement information including media stream information and/or user information to the MGC via a decision request event carried in a Notify command.

Here, media stream information and/or user information may be obtained by the MG from the media stream establishing request of the user or determined by the MG according to the attribute of the specific terminal.

Step 203: The MGC receives the Notify command from the MG and, according to the media stream information and/or user information in the command and/or resource status, makes a resource provision decision, for example, the maximum bandwidth of the media stream to be established, and/or the highest priority level, and/or the destination range. And then, the MGC delivers the resource provision decision to the MG.

Step 204: Upon reception of the resource provision decision, the MG executes the resource provision decision to establish a media stream for the user.

The above is a description of the first embodiment of the invention.

In a second embodiment of the invention, the MGC first makes a resource provision decision according to service requirement from a user and/or resource status information but does not deliver the resource provision decision to the MG immediately. The MGC sends the resource provision decision to the MG upon reception of a decision request from the MG.

Figure 3:
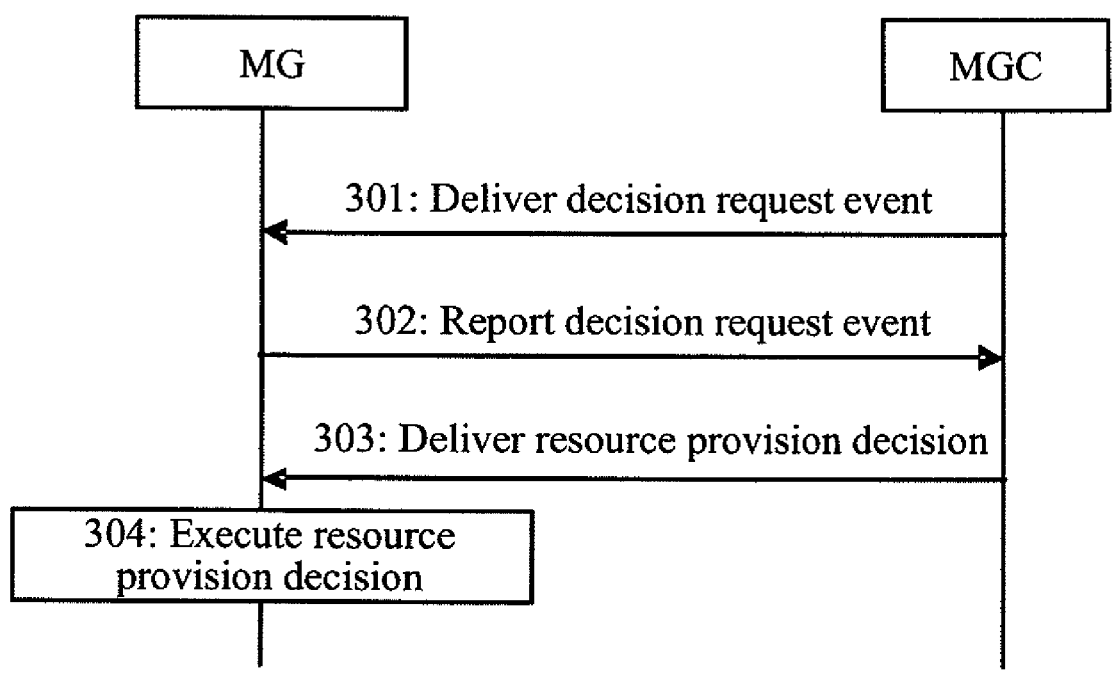
FIG. 3 shows a procedure where an MGC delivers a resource provision decision to an MG according to a second embodiment of the invention.

A procedure according to this embodiment is shown in FIG. 3, including the following steps:

Step 301: Upon reception of the service requirement information from a user, the MGC pre-makes a resource provision decision according to the service requirement information and/or resource status, generates an authorization flag associated with the resource provision decision, and sends the generated authorization flag to the user, and meanwhile delivers a decision request event to a specific terminal on the MG.

Like in the prior art, the service requirement information in this step includes media stream information and/or user information; the made resource provision decision may include the maximum bandwidth of the media stream, the highest priority, or the destination range, or any combination of them.

In this step, the specific terminal on the MG may be a root terminal or a specific terminal corresponding to the media stream information and/or user information.

In addition, the authorization flag generated in this step may include information of the media stream, such as a session identifier and/or a stream identifier.

Step 302: The specific terminal on the MG receives the decision request event and starts detecting the possible request for a resource provision decision. Upon reception of a media stream establishing request that carries the authorization flag from the user, the MG determines and detects the need to request a resource decision request. The MG resolves the authorization flag for the media stream establishing request and reports the resolved authorization flag to the MGC via the decision request event.

Here, the specific terminal on the MG may report the decision request event via a Notify command.

Step 303: The MGC finds the resource provision decision associated with the authorization flag according to the authorization flag in the received decision request and delivers the resource provision decision to the specific terminal on the MG that initiates the decision request.

Step 304: The specific terminal on the MG executes the resource provision decision to establish a media stream for the user.

The above is a description of the second embodiment of the invention.

A third embodiment of the invention is based on the second embodiment with a difference in Step 303, where the MGC may adjust the found resource provision decision according to service requirement information and/or user information before delivering the resource provision decision to the specific terminal on the MG so that the resource provision decision better fits the current service requirement and resource status. For example, the MGC determines a maximum bandwidth of 10 Mbit/s for the user in the resource provision decision made according to the service requirement information of the user and/or resource status in Step 301, but in Step 302 when the MG reports a decision request to the MGC, the service requirement information reported by the MG in the decision request only requires a maximum bandwidth of 2 Mbit/s. In this case, the MGC may adjust the maximum bandwidth in the resource provision decision to 2 Mbit/s according to the service requirement information. For another example, the MGC determines a maximum bandwidth of 10 Mbit/s for the user in the resource provision decision made according to the service requirement information of the user and/or resource status in Step 301, but in Step 302 when the MG reports a decision request to the MGC, the MGC finds that only 5 Mbit/s resources are left on the MG according to the resource status information. In this case, the MGC may adjust the maximum bandwidth in the resource provision decision to 5 Mbit/s according to the resource status information.

When the foregoing embodiments are applied, according to definitions of H.248, each command has a request and response mechanism.

A system for implementing the above method according to an embodiment of the invention includes an MGC and an MG. The MG is adapted to receive a media stream establishing requests from a user, generate a decision requests for requesting a resource provision decision, and report the decision request to the MGC.

The MGC is adapted to receive the decision request from the MG, make a resource provision decision according to service requirement information and/or resource status, and deliver the resource provision decision to the MG.

The handling procedure of the system in an embodiment of the invention is as follows:

First, the MG starts detecting the possible request for a resource provision decision according to a preset decision request event. When the MG detects a media stream establishing request from a user, the MG determines that it is necessary to request a resource provision decision. After the decision request event preset in the MG detects the request, the MG reports service requirement information including media stream information and/or user information to the MGC via a decision request event carried in a Notify command.

Here, media stream information and/or user information may be obtained by the MG from the media stream establishing request of the user or determined by the MG according to the attribute of the specific terminal.

The MGC receives the Notify command from the MG and makes a resource provision decision according to the media stream information and/or user information in the command and/or resource status. For example, the MGC decides the maximum bandwidth of the media stream to be established, and/or the highest priority level, and/or the destination range. Then, the MGC delivers the made resource provision decision to the MG.

As a specific implementation, the media stream establishing request received by an MG and the decision request generated by the MG include an authorization flag associated with the resource provision decision; the MGC is further adapted to generate the authorization flag associated with the resource provision decision, send the authorization flag to the user, and match the associated resource provision decision according to authorization flag in the received decision request.

Preferably, the MGC is further adapted to send an event for implementing a decision request to the MG, or an event for implementing a decision request is preset in the MG In this implementation mode, the handling procedure of the system is as follows:

Upon reception of service requirement information from a user, the MGC pre-makes a resource provision decision according to the service requirement information and/or resource status, generates an authorization flag associated with the resource provision decision, and sends the generated authorization flag to the user, and meanwhile sends a decision request event to a specific terminal on the MG.

The service requirement information in this step includes media stream information and/or user information; the made resource provision decision may include the maximum bandwidth of the media stream, the highest priority, or the destination range, or any combination of them.

In this step, the specific terminal on the MG may be a root terminal or a specific terminal corresponding to the media stream information and/or user information.

In addition, the authorization flag generated in this step may include information of the media stream, such as a session identifier and/or a stream identifier.

The specific terminal on the MG receives the decision request event and starts detecting the possible request for a resource provision decision. Upon reception of a media stream establishing request that carries the authorization flag from the user, the MG determines and detects the need to request a resource decision request. The MG resolves the authorization flag for the media stream establishing request and reports the resolved authorization flag to the MGC via the decision request event.

The MGC finds the resource provision decision associated with the authorization flag according to the authorization flag in the received decision request and delivers the resource provision decision to the specific terminal on the MG that initiates the decision request.

According to an embodiment of the invention, an MGC may include the following modules:

a decision request receiving module, adapted to receive a decision request for requesting a resource provision decision from the MG;

a decision making module, adapted to make a resource provision decision according to service requirement information and/or resource status information; and a decision delivery module, adapted to deliver the resource provision decision made by the decision making module to the MG upon reception of a decision request by the decision request receiving module.

Preferably, the decision request receiving module further includes an authorization flag transferring unit, adapted to send the authorization flag in the received decision request to the decision making module.

The decision making module further includes:

an authorization flag generating unit, adapted to generate an authorization flag associated with the resource provision decision made by the decision making module and deliver the authorization flag to the user; and an authorization flag matching unit, adapted to match the appropriate resource provision decision among the resource provision decisions pre-made by the decision making module according to the authorization flag from the decision request receiving module.

The decision making module further includes a decision adjusting unit adapted to adjust a resource provision decision already made by the decision making module according to service requirement information and/or resource status information.

Preferably, the decision request receiving module further includes a service requirement information transferring unit, adapted to send the service requirement information in the decision request received by the decision request receiving module to the decision making module.

The MGC may include an event delivery module, adapted to deliver an event for implementing a decision request.

According to an embodiment of the invention, an MG may include the following modules:

a media stream establishing request receiving module, adapted to receive a media stream establishing request from a user;

a decision request generating module, adapted to generate a decision request for requesting a resource provision decision according to the media stream establishing request;

a decision request reporting module, adapted to report the decision request generated by the decision request generating module to the MGC; and a decision receiving module, adapted to receive the resource provision decision from the MGC.

Preferably, the media stream establishing request receiving module further includes an authorization flag forwarding unit, adapted to forward the authorization flag in the media stream establishing request received by the media stream establishing request receiving module to the decision request generating module.

The decision request generating module is adapted to generate a decision request that includes the authorization flag.

The decision request generating module further includes a service requirement information obtaining unit, adapted to obtain service requirement information including media stream information and/or user information.

The decision request generated by the decision request generating module includes the service requirement information.

The MG may further include an event configuring module, adapted to store a preset decision request event; or the MG further includes an event receiving module, adapted to receive a decision request event delivered by the MGC.

In an embodiment of the invention, the MGC does not deliver the resource provision decision already made according to service requirement information and/or resource status information until reception of a decision request from the MG so that the MGC delivers a resource provision decision passively upon request of the MG. The Pull mode for delivery of the resource provision decision is thus supported.

In addition, in an embodiment of the invention, because the MG request a resource provision decision from the MGC after reception of a media stream establishing request from a user, it is unnecessary for the MG to store a resource provision decision in the period before reception of the media stream establishing request, thus reducing occupation of the MG storage space.

Further, in an embodiment of the invention, before the MGC delivers an already made resource provision decision according to a request of the MG, the MGC adjusts the resource provision decision according to service requirement information and/or resource status so that the resource provision decision suits the current service requirement and resource status more properly when finally executed.

Although the technical scheme of the present invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for a media gateway controller, MGC, that delivers a resource provision decision to a media gateway, MG, the method comprising:

determining, by an MGC, a resource provision decision according to service requirement information of a user equipment, UE, and resource status information, generating an authorization flag associated with the resource provision decision, and returning the generated authorization flag to the UE;

receiving, by the MGC, a decision request from an MG, wherein the decision request comprises the authorization flag; and obtaining, by the MGC, the resource provision decision associated with the authorization flag, according to the authorization flag in the decision request, and delivering the resource provision decision to the MG.

2. The method according to claim 1, wherein before the MGC delivers the resource provision decision to the MG, the method further comprises:

adjusting, by the MGC, the determined resource provision decision according to service requirement information and resource status information.

3. A system for an MGC to deliver a resource provision decision to an MG, wherein the system comprises an MG and an MGC, and wherein, the MG is configured to receive a media stream establishing request from an UE, generate a decision request for requesting a resource provision decision, and report the decision request to the MGC; and the MGC is configured to receive the decision request from the MG, determine the resource provision decision according to service requirement information and resource status information, and deliver the resource provision decision to the MG;

wherein the media stream establishing request and the decision request contain an authorization flag associated with the resource provision decision; and the MGC is further configured to generate the authorization flag associated with the resource provision decision, deliver the authorization flag to the UE, and match the corresponding resource provision decision according to the authorization flag in the received decision request.

4. The system according to claim 3, wherein the MGC is further configured to deliver an event for implementing the decision request to the MG; or the MG is configured to configure an event for implementing the decision request in advance.

* * * * *